(12) United States Patent
Sheena

(10) Patent No.: US 8,616,123 B2
(45) Date of Patent: Dec. 31, 2013

(54) APPARATUS, SYSTEM, AND METHOD FOR ADDRESSING A MULTITUDE OF KITCHEN, FOOD PREPARATION, AND CULINARY NEEDS

(75) Inventor: Stephanie E. Sheena, Dallas, TX (US)

(73) Assignee: Stephanie E. Sheena, Dallas, TX (US)

( * ) Notice: Subject to any disclaimer, the term of this patent is extended or adjusted under 35 U.S.C. 154(b) by 431 days.

(21) Appl. No.: 12/257,251

(22) Filed: Oct. 23, 2008

(65) Prior Publication Data

US 2009/0249967 A1    Oct. 8, 2009

Related U.S. Application Data

(60) Provisional application No. 61/042,426, filed on Apr. 4, 2008.

(51) Int. Cl.
*B30B 9/22* (2006.01)

(52) U.S. Cl.
USPC ............. 100/37; 100/104; 100/211; 100/297; 99/495; 426/425

(58) Field of Classification Search
USPC ........... 100/104, 122, 123, 211, 297, 37, 110, 100/126; 99/323, 495; 426/425, 531
See application file for complete search history.

(56) References Cited

U.S. PATENT DOCUMENTS

| | | | | |
|---|---|---|---|---|
| 60,060 A | * | 11/1866 | Robinson | 100/211 |
| 244,121 A | * | 7/1881 | Gandy et al. | 100/297 |
| 634,901 A | * | 10/1899 | Monnig | 100/122 |
| 1,053,838 A | | 2/1913 | Livingood | |
| 1,281,984 A | | 10/1918 | Long | |
| 1,532,525 A | * | 4/1925 | Younker et al. | 100/123 |
| 1,663,298 A | * | 3/1928 | Geer et al. | 210/498 |
| 2,770,181 A | * | 11/1956 | Kahan | 99/298 |
| 3,040,655 A | | 6/1962 | Byars | |
| 3,213,474 A | * | 10/1965 | Toth | 15/222 |
| 4,702,831 A | | 10/1987 | Gerteis | |
| 4,794,854 A | * | 1/1989 | Swaim | 100/112 |
| 5,706,721 A | * | 1/1998 | Homes | 99/495 |
| 6,269,741 B1 | * | 8/2001 | Young | 100/113 |
| 7,591,219 B2 | * | 9/2009 | Saha | 99/323 |
| 2007/0175335 A1 | * | 8/2007 | Liverani et al. | 99/279 |
| 2008/0017048 A1 | * | 1/2008 | Donnellan | 99/425 |
| 2008/0149552 A1 | * | 6/2008 | Murphy | 210/251 |

OTHER PUBLICATIONS

Duxelles—May 7, 2006; 4 pages.*

* cited by examiner

*Primary Examiner* — Jimmy T Nguyen
(74) *Attorney, Agent, or Firm* — Patent Capital Group

(57) ABSTRACT

An apparatus is provided and, in one example embodiment, includes a plurality of holes occupying a center region of the apparatus. The apparatus also includes a perimeter that surrounds the holes such that an end user can grasp the perimeter when utilizing the apparatus. An object may be placed in contact with the holes and the perimeter folded inward toward the center region such that twisting of the apparatus extracts liquid from the object. In more specific embodiments, the holes are substantially equidistant from each other or staggered. The apparatus can be square in shape. In still other embodiments, the apparatus includes a recessed cavity, where the object is placed in the cavity before the twisting operation occurs.

9 Claims, 7 Drawing Sheets

APPARATUS, SYSTEM, AND METHOD FOR ADDRESSING A MULTITUDE OF KITCHEN, FOOD PREPARATION, AND CULINARY NEEDS

CLAIMING PRIORITY ON A PROVISIONAL

This application claims priority under 35 U.S.C. §119 of provisional application Ser. No. 61/042,426, filed Apr. 4, 2008 and entitled LIQUID EXTRACTION DEVICE.

TECHNICAL FIELD OF THE INVENTION

This invention relates in general to fluid removal and, more particularly, to an apparatus, a system and a method for addressing a multitude of kitchen, food preparation, and culinary needs.

BACKGROUND OF THE INVENTION

People often find themselves in a predicament where fluid is sought to be drained from a given object. This could involve food matter (e.g., frozen spinach, lemons, etc.), or implicate other objects that have an abundance of moisture or that need to be broken down further.

Current draining methods are inefficient, consume unnecessary resources, and leave behind a considerable mess. Consider a simple towel wringing mechanism and its subsequent footprint left behind. In using a cloth towel for draining a given piece of food, the towel becomes stained. This stain is not easily removed, as the food matter has been ground into the towel. Moreover, in some cases, the particulates that are left behind in the towel may be something that a food preparer would like to salvage. This is impossible to achieve when using simple cloth tools.

Other devices to accomplish such draining and wringing tasks suffer from similar shortcomings. Thus, providing a convenient, affordable, effective, and reliable mechanism for removing liquid from various objects presents a significant challenge for tool manufacturers and device designers, alike.

BRIEF DESCRIPTION OF THE DRAWINGS

To provide a more complete understanding of the present invention and features and advantages thereof, reference is made to the following description, taken in conjunction with the accompanying figures, where like reference numerals represent like parts, in which.

DETAILED DESCRIPTION OF THE INVENTION

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Figure 1:
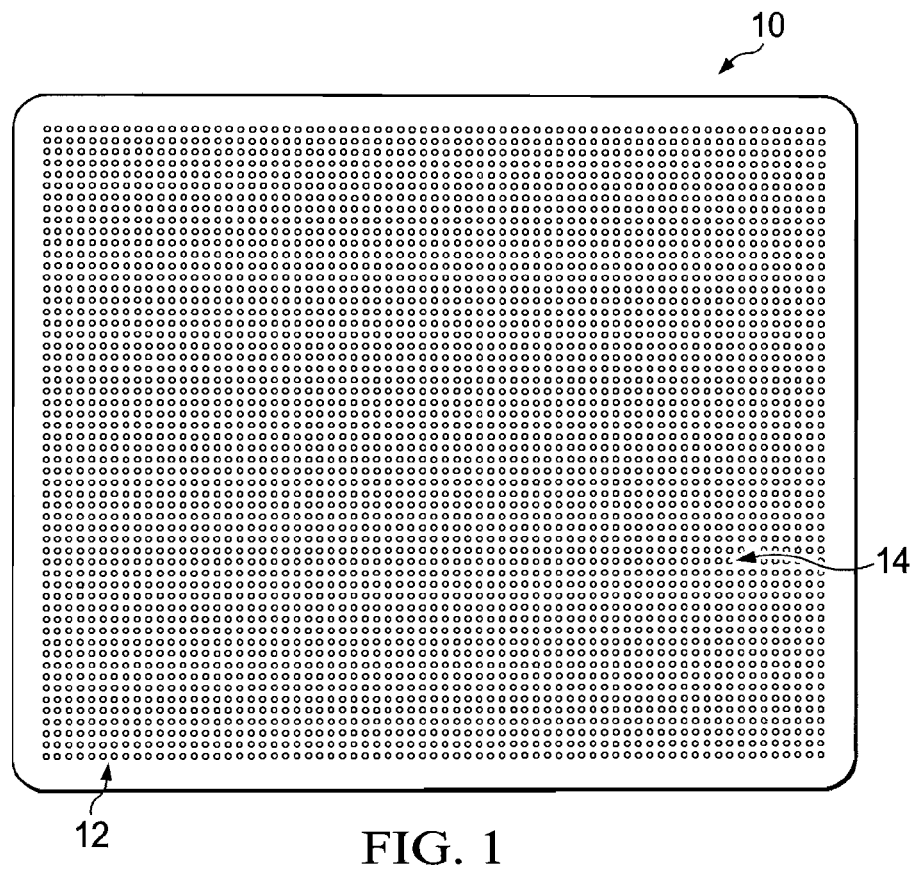
FIG. 1 is a simplified schematic diagram that illustrates an apparatus for addressing a multitude of kitchen, food preparation, and culinary needs in accordance with a particular embodiment of the present invention.
Figure 2:
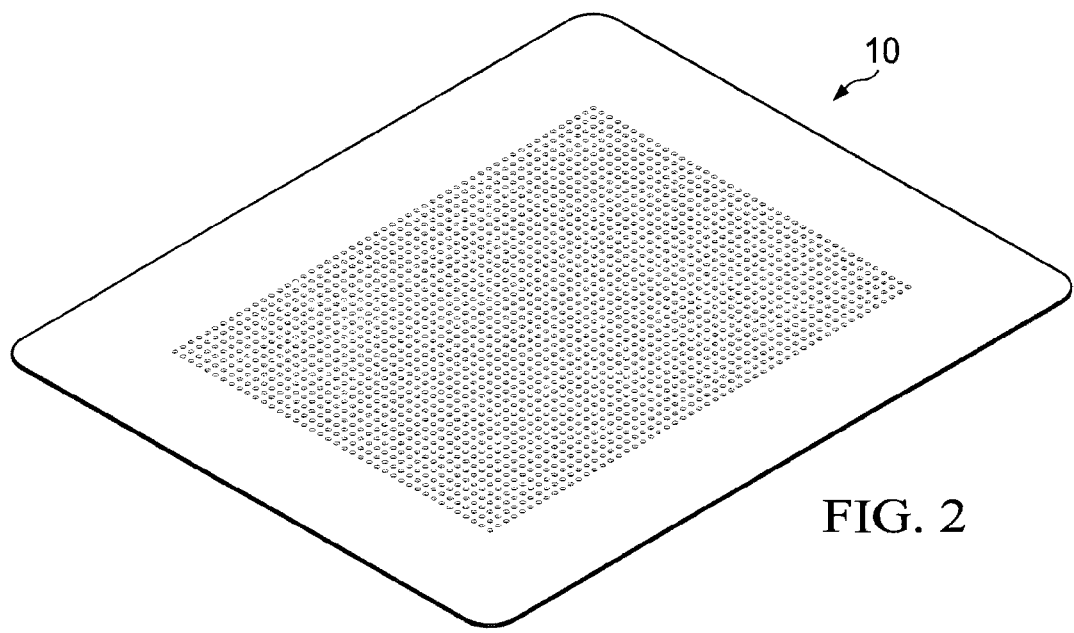
FIG. 2 is a simplified schematic view of another embodiment of the apparatus of FIG. 1.

FIG. 1 is a simplified schematic diagram that illustrates an apparatus 10 for addressing a multitude of kitchen, food preparation, and culinary needs in accordance with a particular embodiment of the present invention. Apparatus 10 includes a series of holes 14 that facilitate some restriction in particulate matter as the device is used for fluid extraction. Apparatus 10 also includes a perimeter 12 that allows a given end user to grasp and secure the device during operation. FIG. 2 is a simplified side view of apparatus 10, where the aforementioned gripping perimeter has been expanded to allow the end user more room for grasping the device. In addition, such a configuration can be used to further confine the targeted food article toward the center of the device.

In terms of the dimensions of the apparatus for removing fluid from a given article, any suitable length, width, and depth (or height) may be used and can be based on particular end user needs or specific elements to be addressed by the apparatus. In one non-limiting embodiment, apparatus 10 of FIG. 1 is $60/1000$ of an inch high, and measuring 10 inches by 11 inches (length×width). In addition, holes 14 are about ⅛ of an inch apart and 1/16 in diameter. Holes 14 can be equidistant or staggered in any other suitable configuration. In one embodiment, there are about 40-60 holes per square inch. Other embodiments may require holes 14 to be smaller (e.g., to catch more particulate matter), or spaced closer together (to extract even more fluid from a substance), or just the opposite where holes 14 are made larger (e.g., to allow more pulp or other particulate matter through a wringing activity), or have the holes be spaced further apart.

It is imperative to note that all of the specifications and relationships outlined herein (e.g., height, width, length, hole diameter, # holes per square inch, etc.) have only been offered for purposes of example and teaching only. Each of these data may be varied considerably without departing from the spirit of the present invention, or the scope of the appended claims. The specifications apply only to one non-limiting example and, accordingly, should be construed as such.

Figure 3A:
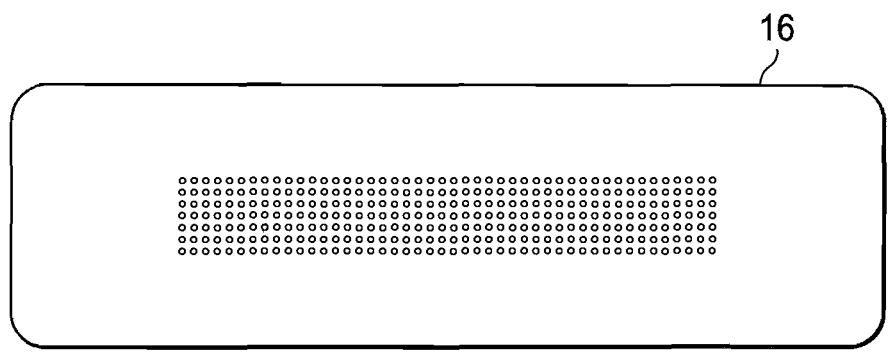
FIGS. 3A-3C are simplified schematic diagrams that illustrate various other embodiments of the apparatus of FIG. 1.
Figure 3B:
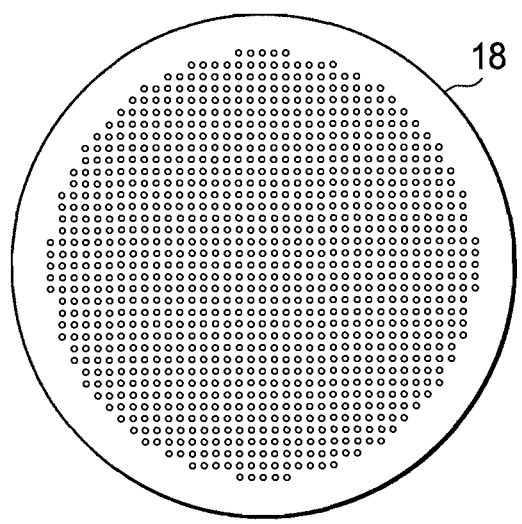
Figure 3C:
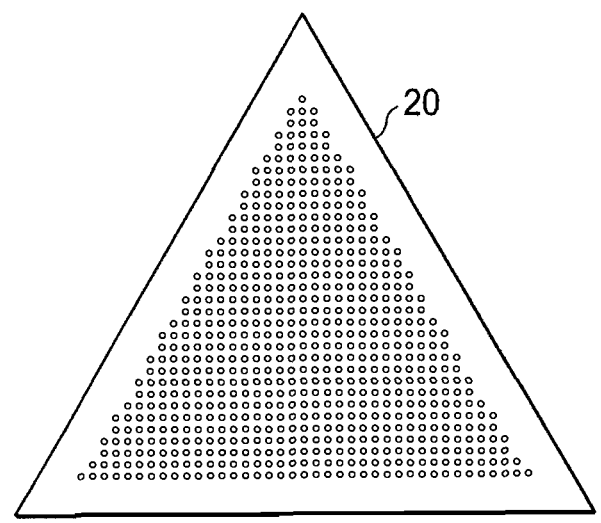

FIGS. 3A-3C are simplified schematic diagrams that illustrate various other embodiments of the apparatus of FIG. 1, including a rectangular apparatus 16, a circular apparatus 18, and a triangular apparatus 20. Other shapes could include a recessed cavity (e.g., shaped as a simple rectangle that forms an interior compartment for the device), where food matter can be placed in the cavity and then the twisting operations could subsequently be performed. Virtually any shape could be employed to achieve the teachings of the present invention and, as such, are encompassed herein in this Specification.

Figure 4A:
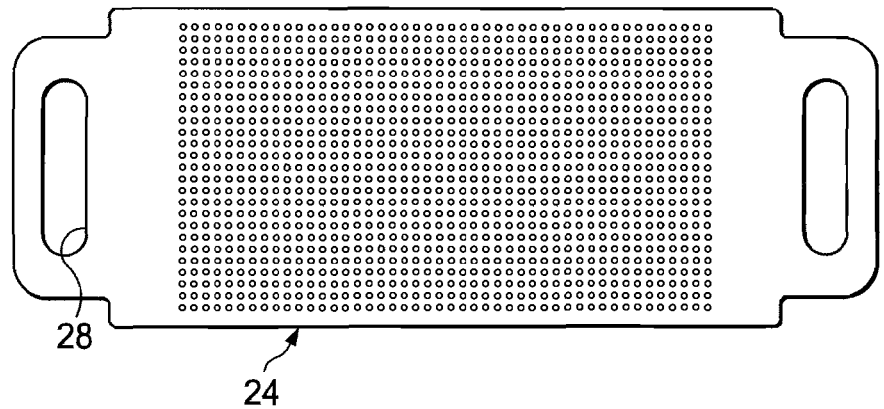
FIGS. 4A-7 are simplified schematic diagrams that illustrate various example activities to be performed by the apparatus of FIG. 1.
Figure 4B:

FIGS. 4A-7 are simplified schematic diagrams that illustrate various activities to be performed by the apparatus of FIG. 1 in accordance with several embodiments of the present invention. FIG. 4A illustrates an apparatus 24 that includes several handles 28. A given object (having some fluid or interior matter sought to be removed) may be placed toward the center of apparatus 24. An end user may then grasp handles 28 and perform a subtle twisting motion, as illustrated by FIG. 4B. The extracted fluid could be readily captured by any suitable receptacle, such as a conventional bowel as shown in FIG. 4B.

Figure 5A:
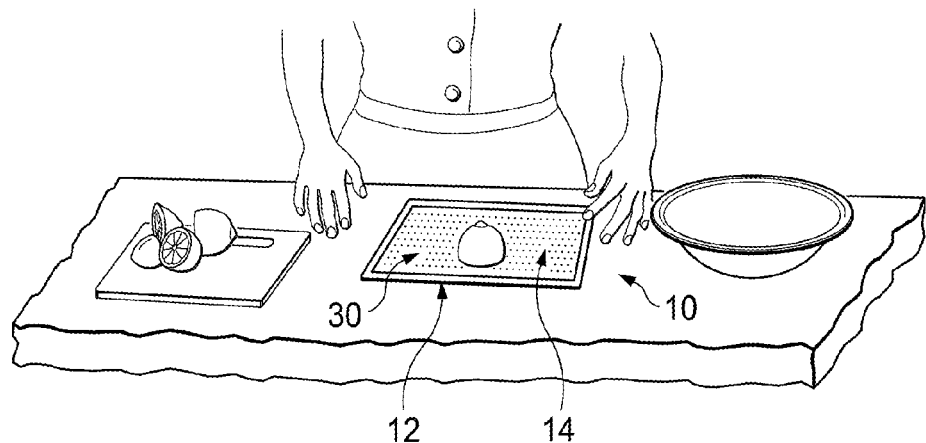
Figure 5B:
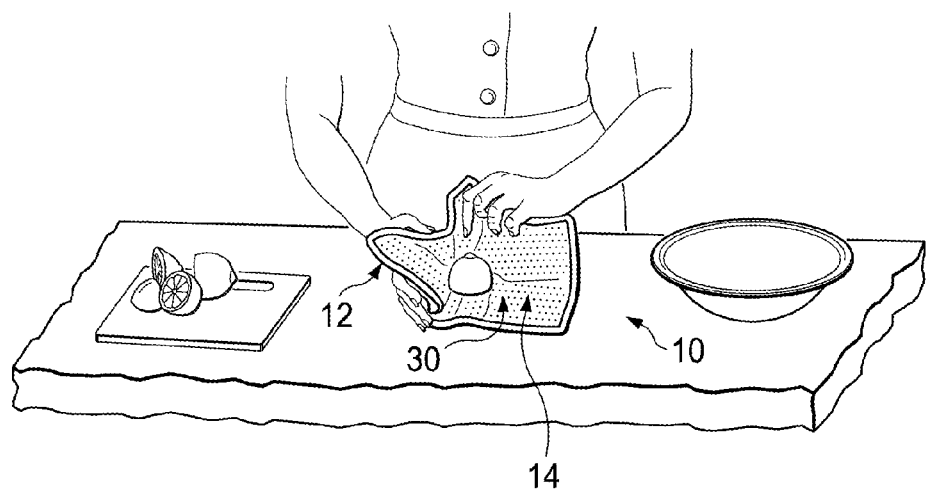
Figure 5C:
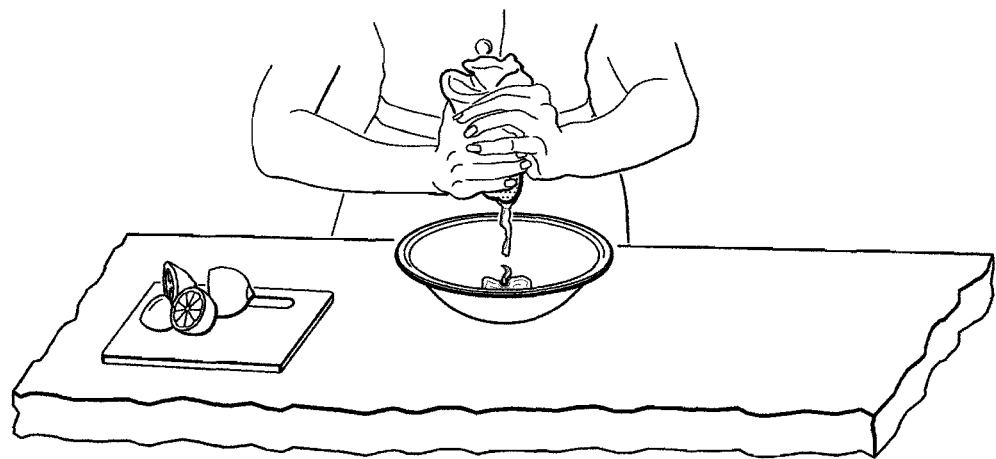
Figure 5D:
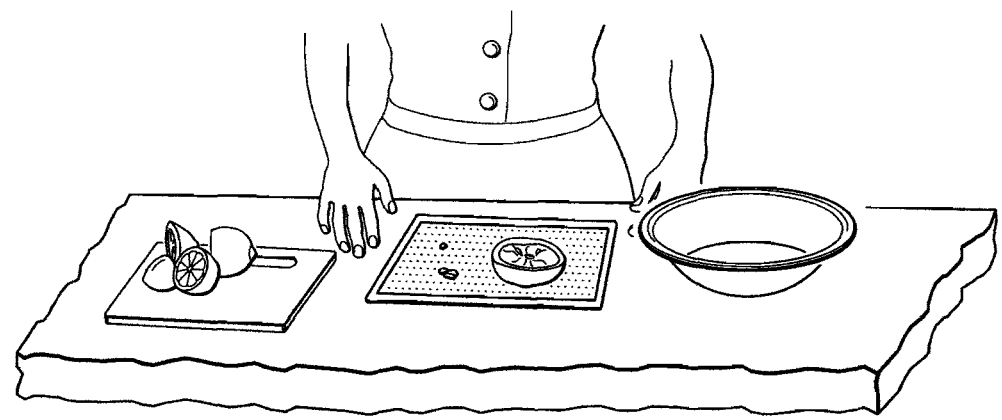

FIGS. 5A-5D illustrate a simple juicing operation for citrus food. FIG. 5A includes apparatus 10. Apparatus 10 includes holes 14, perimeter 12, and a recessed cavity 30 that forms an interior compartment for the device. In a particular embodiment, a surface of recessed cavity 30 includes holes 14. In another particular embodiment, shown in FIG. 5A, perimeter 12 extends above and around recessed cavity 30 to allow a given end user to grasp and secure perimeter 12 during operation. The targeted food (in this example case, a lemon) can be placed toward the center of the device in recessed cavity 30. The outside edges of the device can be folded into the center and a simple twisting of the device allows the inherent juice to flow through the holes and to a receptacle. If desired, the remaining pulp or seeds can be salvaged and used for any relevant purpose. Note that as used herein in this Specification, the term "twist" is meant to encompass any type of squeezing, wringing, or general pressuring of apparatus 10 when it hold various objects.

Figure 6A:
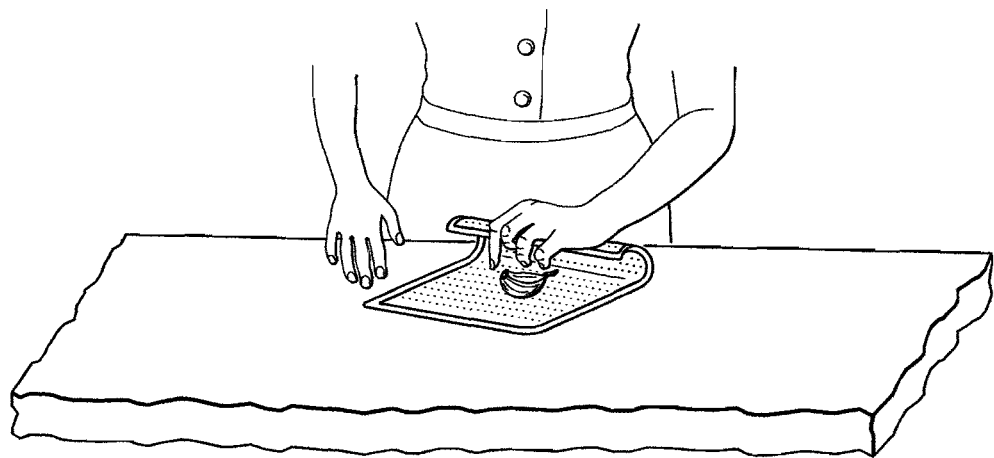
Figure 6B:
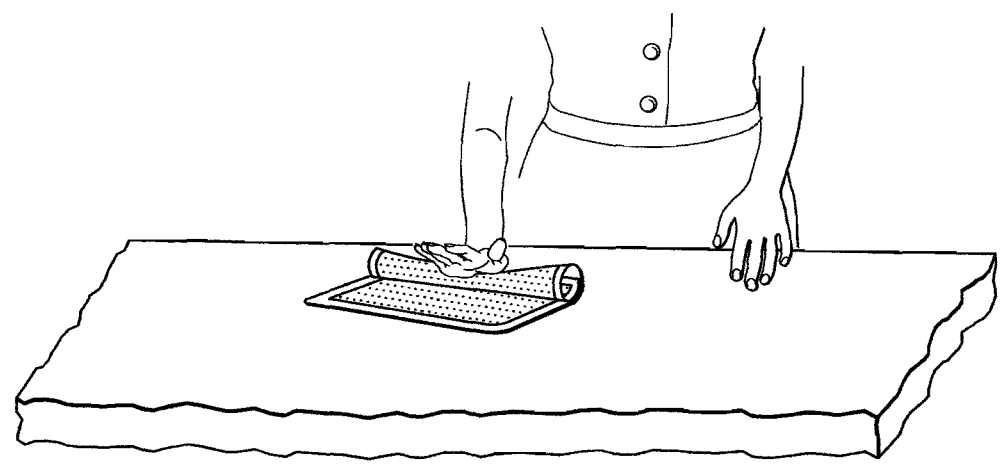
Figure 6C:
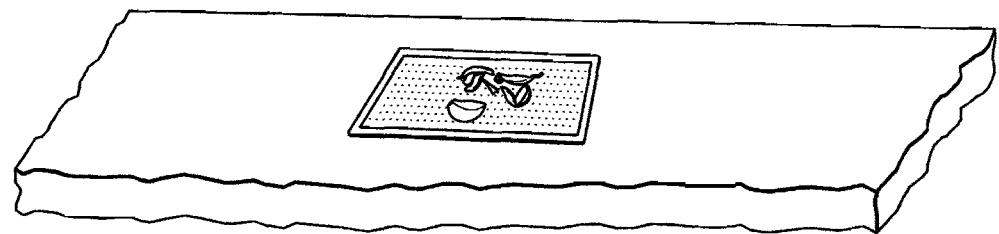

FIGS. 6A-6C illustrate yet another example of apparatus 10, where a simple piece of garlic is being manipulated. In this instance, the garlic is placed toward the center of the device and then the device is rolled on top of itself, whereby the rolling mechanism breaks the garlic into segmented chunks, as is desired for this application. A simple heel of the hand can be used to break up the enclosed food matter.

Note that the preceding FIGURES are only offering a sampling of the myriad of possible applications that involve apparatus 10. Other application could involve other types of food, particularly those food types, which leave a strong residue or stain. One such prominent example could be frozen spinach, which apparatus 10 would be ideal for in terms of minimizing a subsequent clean up.

Note that apparatus 10 may be constructed of any appropriate plastic or rubber material. In one embodiment, a thermoplastic elastomer (TPE) is used, such as Santoprene. Other rubber and polypropylene materials could readily be used in apparatus 10. Note also that the choice of a TPE allows apparatus 10 to be food safe and readily cleaned in a conventional dishwasher. The TPE possesses the same levels of flexibility and durability that are commonly found with natural rubber compounds; however, they generally have a longer life in both extreme hot and cold environments.

Figure 7:
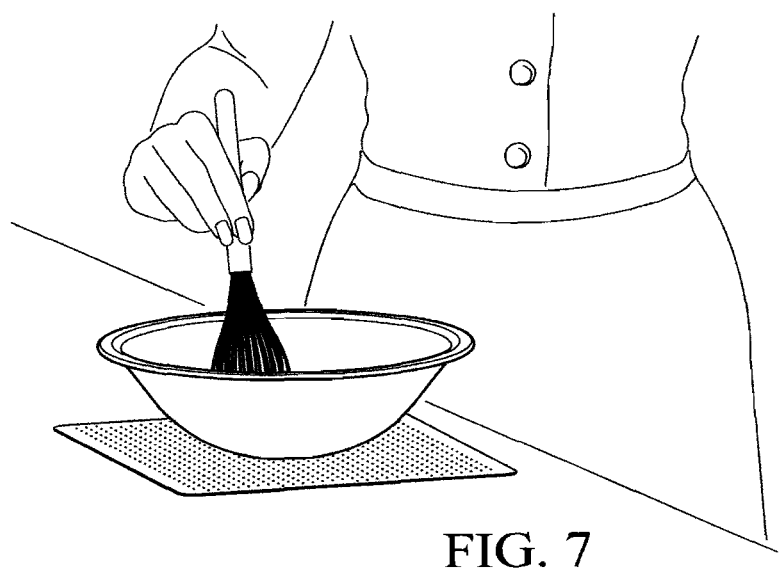

FIG. 7 illustrates some additional uses of the device. In this example, apparatus 10 is being used as a stabilizing agent or mat, where a mixing activity is occurring in a bowel that rests on top of apparatus 10. Other applications could include apparatus 10 being used as a colander, a simple strainer, or a sieve. In still other applications, apparatus 10 could be used to open jars, or to drain water from canned meats, fish, etc. Apparatus 10 can also be suspended to provide a continuous drainage for any suitable material.

It is important to note that the stages and steps described above illustrate only some of the possible operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered.

The preceding example flows have been offered for purposes of teaching and discussion. Substantial flexibility is provided by the tendered system in that any suitable arrangements, chronologies, configurations, and timing mechanisms may be provided without departing from the broad scope of the present invention. Accordingly, any appropriate ancillary structure, component, or device may be included along with apparatus 10 to effectuate the tasks and operations of the elements and activities associated with providing an optimal liquid extraction of objects.

Although the present invention has been described in detail with reference to particular embodiments, it should be understood that various other changes, substitutions, and alterations may be made hereto without departing from the spirit and scope of the present invention. The illustrated device and operations have only been offered for purposes of example and teaching. Suitable alternatives and substitutions are envisioned and contemplated by the present invention: such alternatives and substitutions being clearly within the broad scope of the proposed solutions. In addition, while the foregoing discussion has focused on food preparation activities, any other suitable environment requiring the extraction of liquids may benefit from the teachings provided herein. It should also be noted that apparatus 10 may be constructed of any suitable combination of rubber, plastic, or any other viable composition that could withstand and readily accommodate the forces as explained herein.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method involving food preparation for a food article, comprising:
    receiving the food article, from which liquid will be extracted, toward a center of an apparatus comprising:
        a center region having a plurality of holes where the food article is to be placed;
        a recessed cavity that forms an interior compartment of the apparatus and that includes the center region, wherein the apparatus is constructed of a thermoplastic elastomer (TPE) material that is to allow the apparatus to be rolled on top of itself; and
        a first handle provided on a first end of the apparatus and a second handle provided on a second end of the apparatus, the first handle has a first opening to accommodate a first hand of a user and the second handle has a second opening to accommodate a second hand of the user, wherein the first and second handles are configured to receive a twisting force from the user such that liquid of the food article is to be extracted and passed through the holes, wherein the apparatus includes a perimeter extending above and around the recessed cavity, the perimeter includes a flat surface having no holes provided thereon, and wherein the apparatus measures at least $60/1000$ of an inch in height as the apparatus rests flat on a surface on which it is to be used.

2. The method of claim 1, wherein the center region includes a range of 40-60 holes per square inch.

3. The method of claim 1, wherein the holes are substantially equidistant from each other or staggered.

4. The method of claim 1, wherein the holes are $1/8$ of an inch apart and $1/16$ in diameter.

5. The method of claim 1, wherein the apparatus is constructed such that is can be cleaned using a conventional dishwasher.

6. The method of claim 1, wherein the apparatus measures at least 10 inches in length and at least 10 inches in width.

7. The method of claim 1, wherein the TPE is Santoprene.

8. The method of claim 1, further comprising:
    capturing the extracted liquid in a bowl.

9. The method of claim 1, wherein the perimeter extending above and around the recessed cavity allows the perimeter to be grasped and secured during operation.

\* \* \* \* \*